US009073381B1

(12) United States Patent
Elmassry

(10) Patent No.: US 9,073,381 B1
(45) Date of Patent: Jul. 7, 2015

(54) WHEELED COMPASS

(71) Applicant: KING SAUD UNIVERSITY, Riyadh (SA)

(72) Inventor: Mohamed Yossry Elmassry, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 14/516,485

(22) Filed: Oct. 16, 2014

(51) Int. Cl.
*B43L 9/04* (2006.01)
*B43L 9/00* (2006.01)
*G01B 3/16* (2006.01)

(52) U.S. Cl.
CPC .................. *B43L 9/045* (2013.01); *B43L 9/005* (2013.01); *G01B 3/166* (2013.01)

(58) Field of Classification Search
USPC .................. 33/27.02, 27.03, 27.05, 27.06
See application file for complete search history.

(56) References Cited

U.S. PATENT DOCUMENTS

| 211,825 | A | | 1/1879 | Worthington | |
|---|---|---|---|---|---|
| 390,360 | A | * | 10/1888 | Gieseler | 33/27.05 |
| 683,780 | A | | 10/1901 | Modjeski | |
| 1,201,209 | A | * | 10/1916 | McMurray | 33/27.03 |
| 1,421,921 | A | * | 7/1922 | Doerr | 33/27.03 |
| 1,460,093 | A | * | 6/1923 | Costovici | 33/27.03 |
| 2,286,664 | A | * | 6/1942 | Anderson | 33/27.03 |
| 2,303,024 | A | * | 11/1942 | Clark | 33/27.03 |
| 2,543,009 | A | | 2/1951 | Frost | |
| 2,551,747 | A | * | 5/1951 | Ille | 33/27.03 |
| 2,817,903 | A | | 12/1957 | Mead | |
| 3,292,262 | A | * | 12/1966 | Moll | 33/27.03 |
| 3,430,347 | A | | 3/1969 | Minniear | |
| D243,013 | S | | 1/1977 | Jones et al. | |
| 4,547,973 | A | * | 10/1985 | Owens | 33/27.03 |
| 5,253,421 | A | * | 10/1993 | Landmark | 33/27.03 |
| 6,223,443 | B1 | * | 5/2001 | Jacobs | 33/27.03 |
| 2006/0207114 | A1 | * | 9/2006 | Stoner | 33/27.03 |
| 2010/0000102 | A1 | * | 1/2010 | Contreras | 33/27.03 |

FOREIGN PATENT DOCUMENTS

| CN | 87 2 14171 U | 8/1988 |
|---|---|---|
| FR | 2 575 420 | 7/1986 |
| GB | 2 327 910 A | 2/1999 |

* cited by examiner

*Primary Examiner* — G. Bradley Bennett
(74) *Attorney, Agent, or Firm* — Richard C Litman

(57) ABSTRACT

A wheeled compass including a shaft having a first portion, including a first end, and a second portion, including a second end, a control rolling member having an adjustable radius, a drawing rolling member having a radius greater than the adjustable radius, the control rolling member and the drawing rolling member being co-axially arranged on the shaft, and a drawing arm coupled to the shaft, the drawing arm being adapted to hold a drawing instrument. The wheeled compass can include a motor, in communication with the control rolling member and the drawing rolling member, adapted to move the wheeled compass. The control rolling member can include a plurality of adjustable rods/adjustable arms. The control rolling member can also include a flexible member to adjust the radius of the control rolling member to correspond to the radius of the wanted circle. The control rolling member can also include a housing.

19 Claims, 15 Drawing Sheets

WHEELED COMPASS

BACKGROUND OF THE INVENTION

1. Field of the Invention

The present invention relates generally to scribing devices, and more specifically, to a compass type device or tool for drawing circles, such as relatively large circles, or portions thereof.

2. Description of the Related Art

In practice, artists, engineers, architects, designers, as well as many other people are required to draw circles or arcs having a required measurement, such as a specific radius. Typically, such individuals use a compass type device or tool to draw the arc or the circle having a specific radius. In order for the compass type device to be of use, however, one of its legs must be anchored in the center of the circle while the other leg including the drawing instrument is rotated about the leg that is anchored in the center of the circle until the arc or circle having the required radius is completed. The radius of the circle or arc can be adjusted by varying the angle between both legs of the compass type device.

Other instruments that can be used to draw arcs or circles include a ruler compass tool, a meter compass tool, and a pin including a string having a discrete length adapted to hold a drawing instrument, for example. However, similar to the compass type device, these compass type devices typically require centering one part of the device in the center of the circle and rotating the other part of the device about the center until the arc or circle having the required radius has been drawn.

If a circle is needed to be drawn around a hole or an immovable object, such as a tree, for example, the above referenced tools would not easily work due to the absence of a center in which to anchor the leg of the compass type device. Further, if the circle or arc needed a radius measured in kilometers, for example, such compass type devices would also not easily work since the size of the radius of the circles that can be drawn by such a compass type device is limited to the angle of the compass tool, the lengths of the ruler or meter sticks, or the length of the string, for example.

Thus, a wheeled compass addressing the aforementioned problems is desired.

SUMMARY OF THE INVENTION

Embodiments of a wheeled compass include a shaft having a first portion, including a first end, and a second portion, including a second end, a control rolling member having a selectively adjustable radius, a drawing rolling member having a given radius greater than the selectively adjustable radius, the control rolling member and the drawing rolling member being co-axially arranged on the shaft, and a drawing arm, having a supporting assembly, such as including a bearing, such as a sleeve bearing, coupled to the shaft, the drawing arm being adapted to hold a drawing instrument at a suitable, predetermined angle formed by the drawing arm and the drawing instrument relative to the position of the drawing arm relative to the shaft. The shaft can be adapted to include a gripping member that can aid in moving the wheeled compass by hand. The wheeled compass can be configured to include at least one and desirably a plurality of securing members to substantially prevent the control rolling member and the drawing rolling member from moving relative to the shaft while the wheeled compass is in motion. The length of the selectively adjustable radius is determined based on the radius of a wanted circle or a portion thereof to be drawn, such as arc of the circle, the given radius of the drawing rolling member and on the length of the shaft.

A further embodiment of a wheeled compass includes a motor having a shaft in communication with the control rolling member and a drive shaft in communication with the drawing rolling member, the control rolling member having a selectively adjustable radius and the drawing rolling member having a radius greater than the selectively adjustable radius. The control rolling member and the drawing rolling member are arranged co-axially in relation to the motor. The embodiment of the wheeled compass also includes a drawing arm, having a supporting assembly, such as including a bearing, such as a sleeve bearing, coupled to the drive shaft, the drawing arm being adapted to hold a drawing instrument. In this embodiment, once the wheeled compass is put on a surface on which a wanted circle or portion thereof, such as an arc of the wanted circle, is to be drawn, the motor can be activated to move the wheeled compass in a suitable direction, desirably in a forward circular direction, until the drawing of the arc or circle having the desired radius is complete.

Embodiments of a control rolling member can also include a set of control rolling members, the set of control rolling members including a plurality of control rolling members to be selectively coupled to the shaft, each control rolling member having a different radius to provide a selectively adjustable radius corresponding to a radius of a wanted circle or a portion thereof, such as a wanted arc of the circle, to be drawn. This embodiment including the plurality of control rolling members operates in a similar manner to the embodiment of the control rolling member described above.

In another embodiment of a wheeled compass, the control rolling member can include a plurality of adjustable rods, such as telescoping rods or a plurality of adjustable arms, such as angularly adjustable arms, that can be used to selectively adjust the length of the radius of the control rolling member so as to draw a wanted circle or portion thereof, such as a wanted arc of the circle, having a specific radius. The control rolling member having a plurality of adjustable rods can include a hub adapted to receive the plurality of adjustable rods. Also, the control rolling member having a plurality of adjustable arms can be coupled to a supporting shaft through corresponding adjustable arm support members and through first and second common coupling members to movably adjust the angular height of the adjustable arms relative to the support shaft.

Each adjustable rod can be configured to include a locking mechanism to substantially prevent the corresponding adjustable rod from substantially increasing or decreasing in length from a set position corresponding to a radius of the wanted circle or portion thereof, such as a wanted arc of the circle. Also, the supporting shaft in conjunction with the second common coupling member can be configured to include a locking arrangement to substantially prevent the corresponding adjustable arm from substantially increasing or decreasing in angular height relative to the supporting shaft from a set position corresponding to a radius of the wanted circle, or portion thereof, such as the wanted arc. Each adjustable rod and adjustable arm can also be configured to include a support member so as to support the control rolling member. These embodiments of the control rolling members respectively including the plurality of adjustable rods and the plurality of adjustable arms operate in a similar manner to the embodiments of the control rolling members described above.

Further, in other embodiments, the control rolling member can include or can be formed of a flexible member, such as a chain or a measuring tape. The flexible member can be wrapped along a track around the control rolling member so as to selectively adjust the radius of the control rolling member, which, in turn, can correspond to a wanted circle or a portion thereof having a specific radius. The chain can be adapted to include a plurality of links. The links of the chain can either be added or removed or the chain can be wrapped one or more times on the control rolling member to selectively adjust the radius of the control rolling member to correspond to the radius of the wanted circle or the portion thereof. The chain can also be configured to include a fastener, such as a latch, so as to secure one end of the chain to the other end of the chain once it has been wrapped around the control rolling member. Also, the measuring tape can be adapted to include a plurality of segments configured to be coupled to one another so as to increase or decrease the length of the overall measuring tape and, in turn, selectively adjust the radius of the control rolling member to correspond to the radius of the wanted circle or portion thereof.

It is to be noted that the control rolling member can also be adapted to include a housing containing a coiled flexible member, such as a coiled chain or a coiled measuring tape, which can be selectively withdrawn to selectively adjust the radius of the control rolling member to correspond to the radius of the wanted circle or the portion thereof. Once selectively withdrawn, the coiled flexible member, such as the coiled chain or the coiled measuring tape, can be wrapped along a track around the control rolling member to selectively increase the radius of the control rolling member to correspond to the radius of the wanted circle or the portion thereof. This embodiment of the control rolling member having a coiled flexible member operates in a similar manner to the embodiments of the control rolling members described above.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1A:
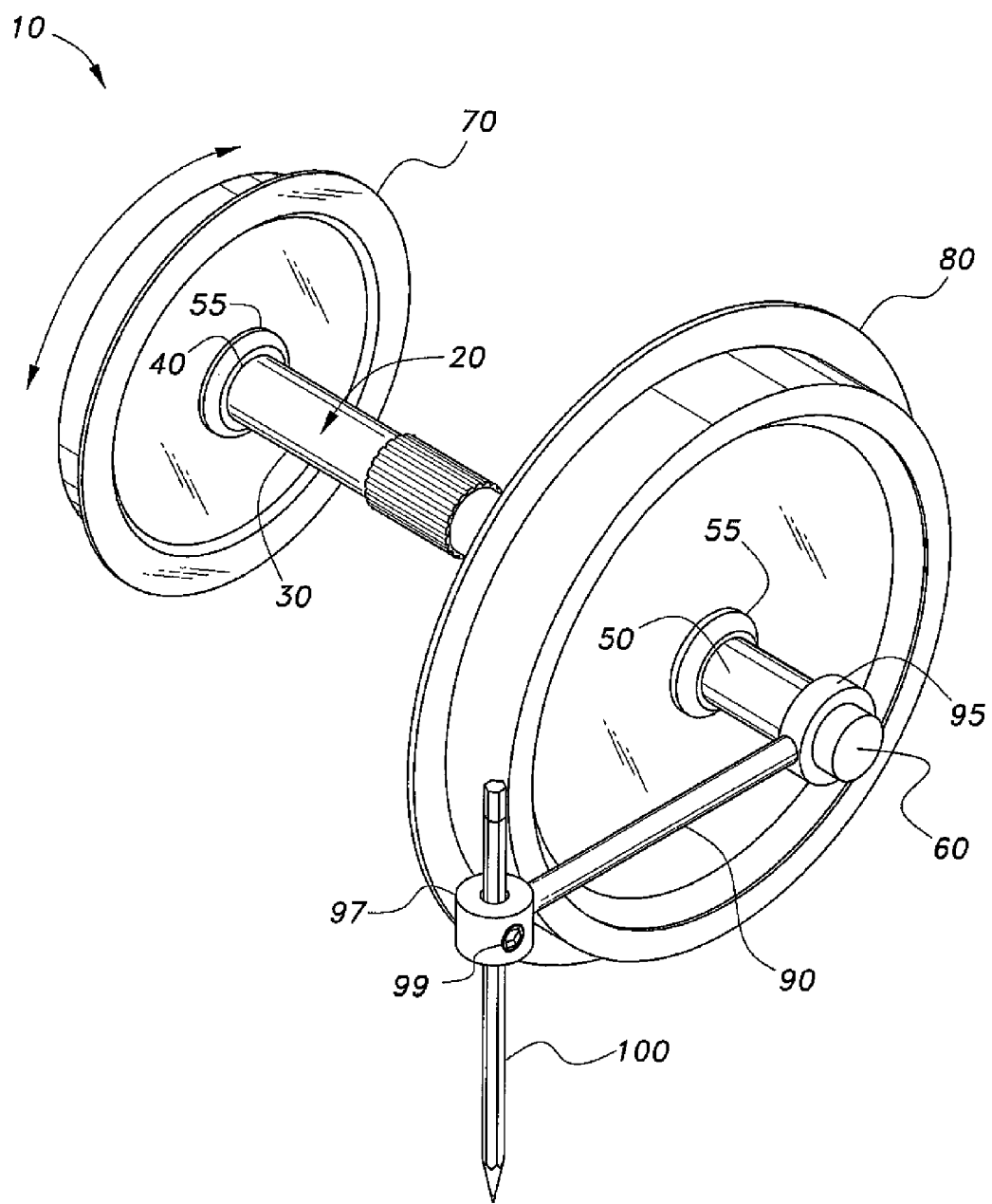
FIG. 1A is an environmental, perspective view of a wheeled compass according to the present invention.
Figure 1B:
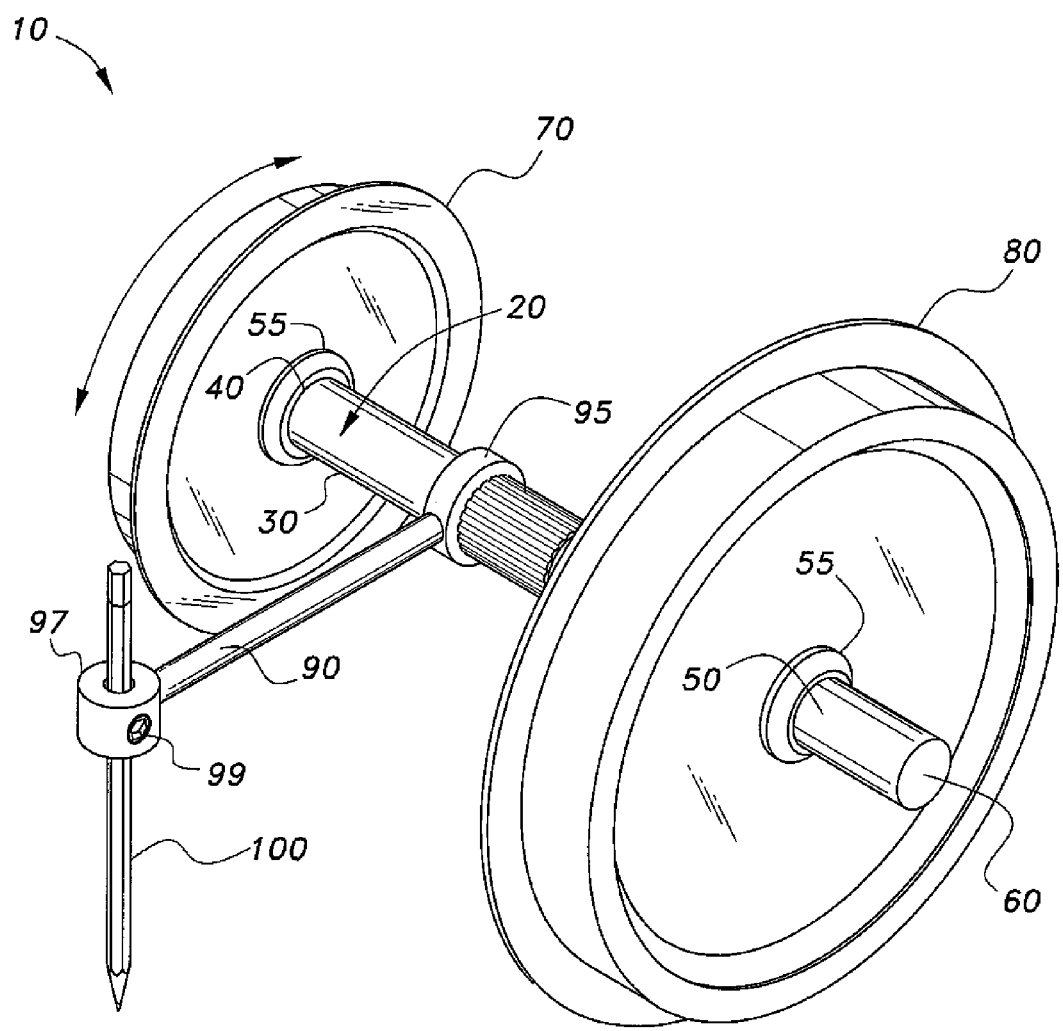
FIG. 1B is an environmental, perspective view of another embodiment of a wheeled compass according to the present invention.

Referring to FIGS. 1A and 1B, an embodiment of a wheeled compass, generally identified as wheeled compass 10, for drawing a circle or a portion thereat such as an arc, is illustrated. The wheeled compass 10 generally includes a shaft 20 having a first portion 30, including a first end 40, and a second portion 50, including a second end 60, a control rolling member 70 having a selectively adjustable radius, the control rolling member 70 being coupled to the first end 40 of the shaft 20. The wheeled compass 10 also includes a drawing rolling member 80 having a given radius greater than the selectively adjustable radius of the control rolling member 70, the drawing rolling member 80 being coupled to the second portion 50 of the shaft 20, the control rolling member 70 and the drawing rolling member 80 being co-axially arranged on the shaft 20. The wheeled compass 10 also includes a drawing arm 90 having a supporting assembly 95, such as including a bearing such as a sleeve bearing, coupled to the shaft 20. The drawing arm 90 as used herein can be any of various suitable attachment devices and attachment members, such as can be of various shapes and configurations, and can include therewith a drawing instrument, such as a drawing instrument 100, as can depend on the use or application, and should not be construed in a limiting sense.

As illustrated in FIGS. 1A and 1B, the drawing arm 90 can be coupled to the second end 60 of the shaft 20 (FIG. 1A) or can be coupled to the shaft 20 at a position in between the control rolling member 70 and the drawing rolling member 80

(FIG. 1B). The drawing arm 90 can also be configured to include a holder 97 being adapted to hold a drawing instrument 100, such as a pencil or stylus, for example. The holder 97 can be configured to include a fastener 99, such as a set screw, to secure the drawing instrument 100 within the holder 97 of the drawing arm 90, the drawing arm 90 being arranged at a suitable, predetermined angle formed by the drawing arm 90 and the drawing instrument 100 relative to the position of the drawing arm 90 relative to the shaft 20. The shaft 20 can be adapted to include at least one and desirably a plurality of securing members 55, such as ringnuts, to substantially prevent the control rolling member 70 and the drawing rolling member 80 from moving relative to the shaft 20 while the wheeled compass 10 is in motion to draw a wanted circle or a portion thereof.

Figure 2:
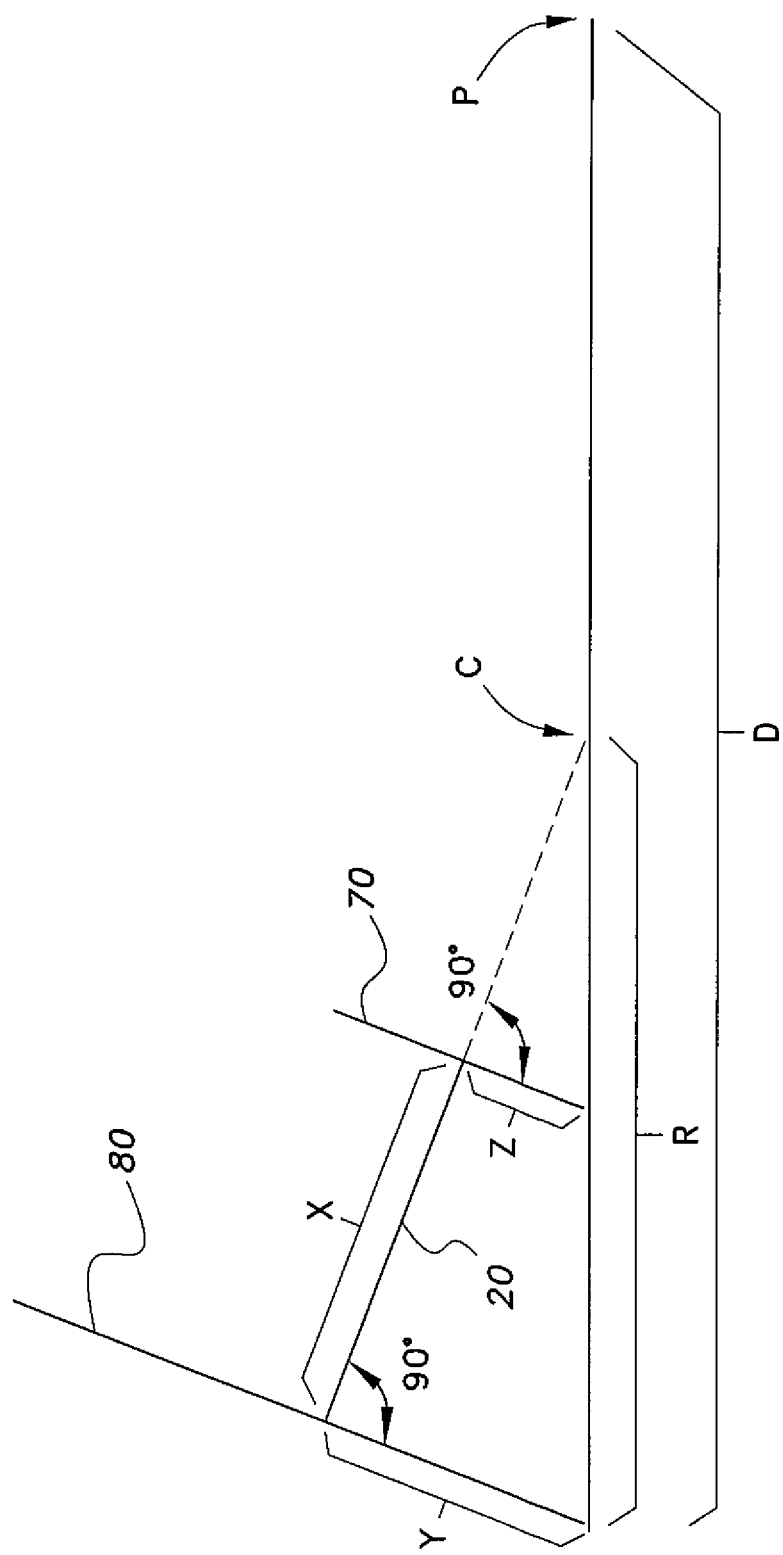
FIG. 2 is a geometric diagram of an embodiment of a wheeled compass according to the present invention.

Referring to FIG. 2, the radius R of a wanted circle, such a radius of a circle 120 (FIG. 3), has a direct proportion with the percentage between the sizes of the control rolling member 70 and the drawing rolling member 80 and is related to their relative positions with respect to each other. This relationship can be described by the following mathematical relation or formula:

$$\text{Radius(R)\_of\_wanted\_circle} = \frac{Y}{\cos\left[\tan^{-1}\left(\frac{X}{Y-X}\right)\right]}. \quad (1)$$

In the above formula or relation (1), X is the length of the shaft 20 between the control rolling member 70 and the drawing rolling member 80, Y is the radius of the drawing rolling member 80, and Z is the radius of the control rolling member 70. From relation (1), knowing the values for X, Y and R, the radius Z of the control rolling member 70 can be determined for a corresponding wanted circle. Also, as illustrated in FIG. 2, the wanted circle has a diameter D and a point P on a perimeter of the wanted circle, for example.

The mathematical formula or relation (1) referenced above assumes that the drawing arm 90 is coupled to the second end 60 of the shaft 20 (FIG. 1A) approximately at the position of the drawing rolling member 80. It is to be noted that the drawing arm 90 can also be positioned at various locations on the shaft 20, such as can be positioned between the control rolling member 70 and the drawing rolling member 80, as illustrated in FIG. 1B, for example. It is to be noted that should the drawing arm 90 be positioned in between the control rolling member 70 and the drawing rolling member 80, as illustrated in FIG. 1B, the radius Z of the control rolling member 70, based on the radius R of the wanted circle, the radius Y of the drawing rolling member 80 and the length X of the shaft 20 as determined by relation (1) above, would likely have a different value from that of the radius Z determined by relation (1) when the drawing arm 90 is positioned at the second end 60 of the shaft 20 approximately at the position of the drawing rolling member 80 on the shaft 20.

The radius Z of the control rolling member 70 and/or the position of the wheeled compass 10 or a wheeled compass 10a (FIG. 4) determined using the above relation (1) would therefore likely need be adjusted, such as by an adjustment factor K, the adjustment factor K can be a value, a mathematical relation or a function, to account for the position of the drawing arm 90 in between the control rolling member 70 and the drawing rolling member 80 on the shaft 20, for example.

Figure 3:
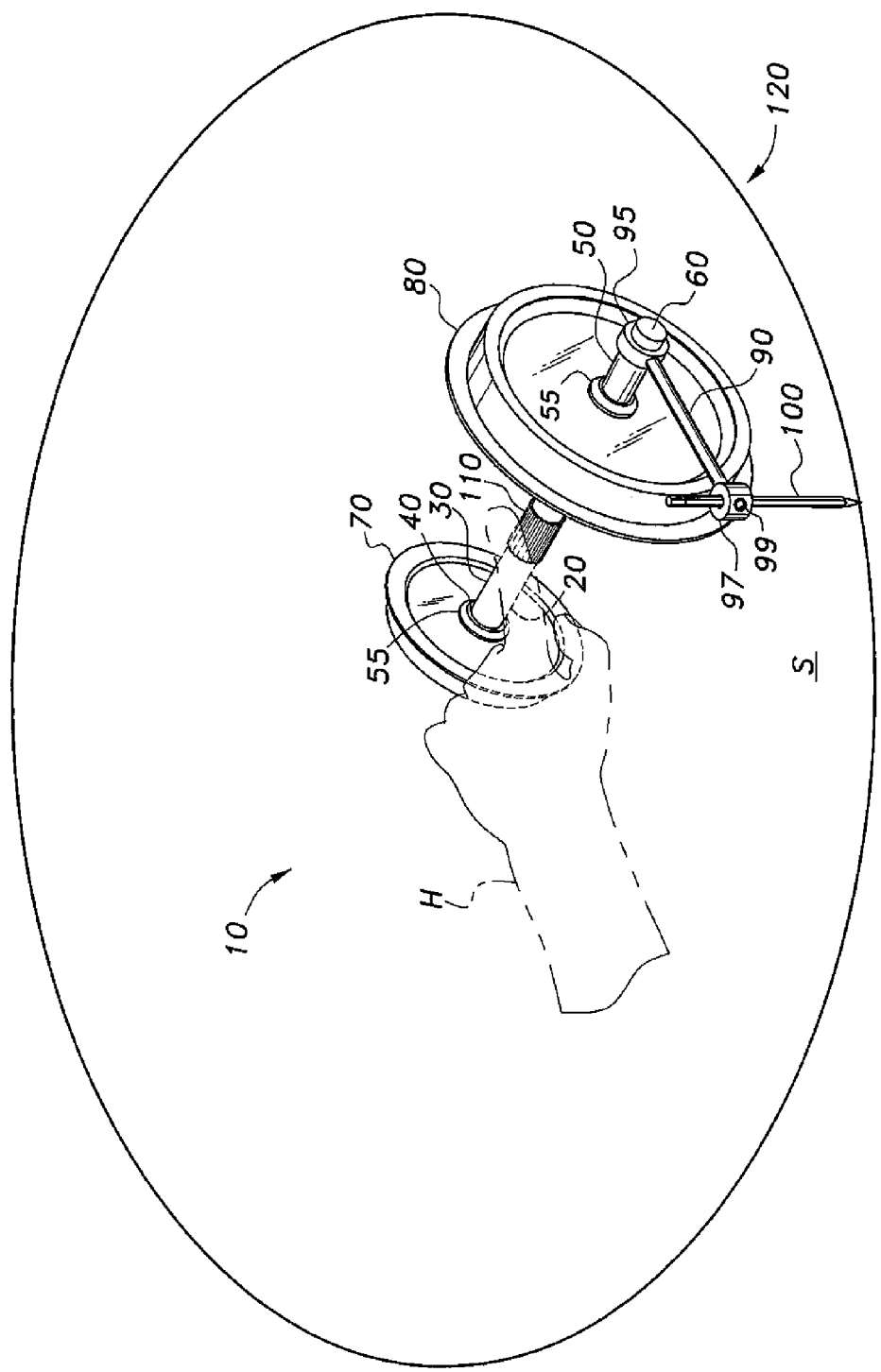
FIG. 3 is a perspective view of an embodiment of a wheeled compass being manually guided according to the present invention.

Continuing with reference to FIGS. 1A, 1B, 2, and 3, the shaft 20 can be formed from any suitable material, such as plastic, metal or wood, and can be any suitable length X needed to draw the wanted circle or the portion thereof, such as the circle 120 as illustrated in FIG. 3, having a specific radius R. The shaft 20 can be formed from a single substantially uniformed member of a suitable material, such as a single piece metal shaft, or multiple members, such as two or more pieces of metal shafts coupled to one another to form the shaft 20 having a particular length. The shaft 20 can also be configured to be adjustable in length, such as a telescoping shaft, which can allow for the use of the wheeled compass 10 in a variety of different environments and for various applications, for example. The shaft 20 can be adapted to contain a gripping member 110 so that the wheeled compass 10 can be rolled in a suitable direction, typically in a forward circular direction, by a hand H along a surface S on which the circle 120 or portion thereof, such as an arc, is to be drawn, as illustrated in FIG. 3.

Figure 4:
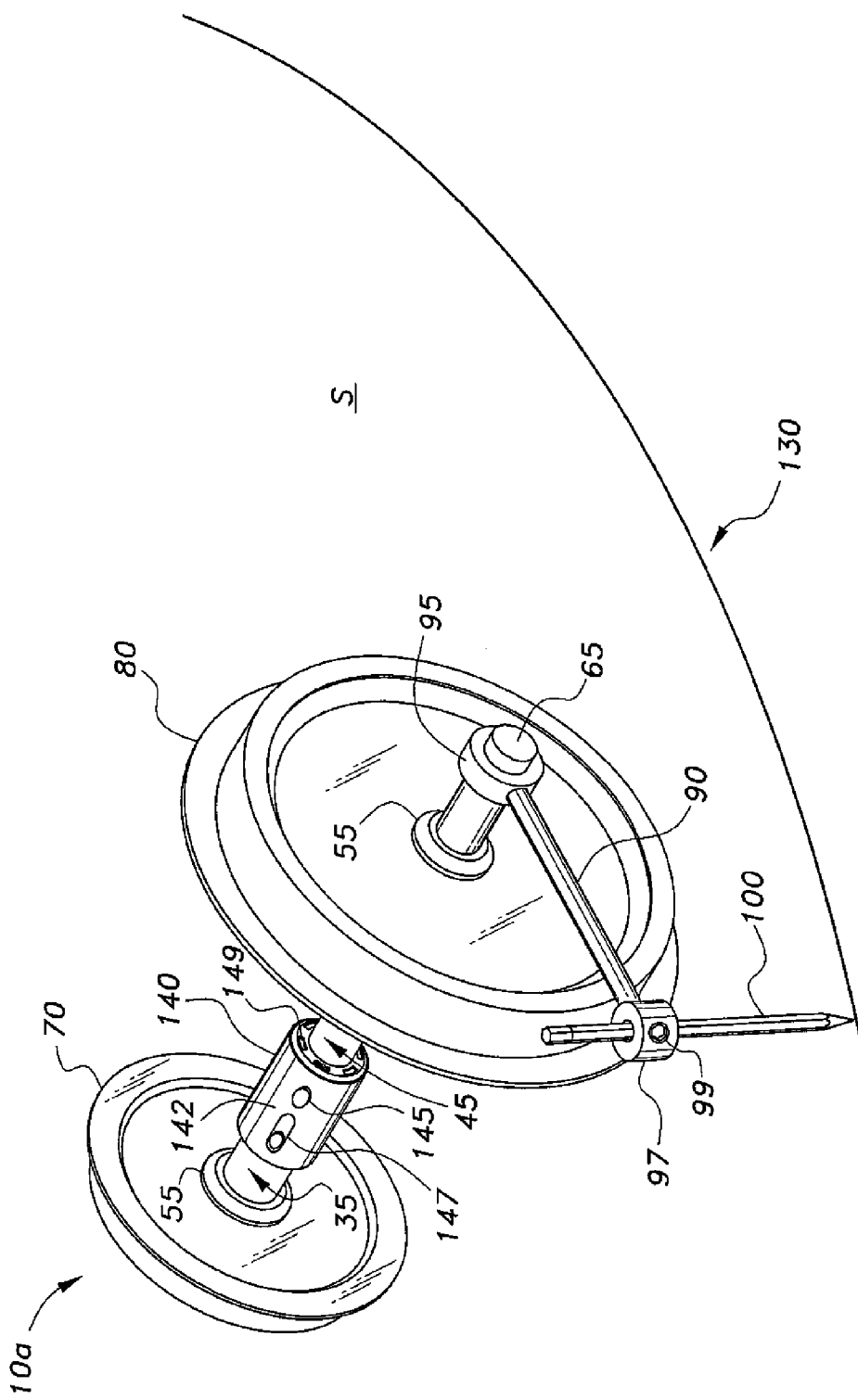
FIG. 4 is a perspective view of an embodiment of a wheeled compass having a motor to drive the wheeled compass according to the present invention.

Referring to FIG. 4, another embodiment of a wheeled compass 10a can be configured to include a motor 140, such a servomotor, having or associated with a shaft 35 in communication with the control rolling member 70, and having or associated with a drive shaft 45 in communication with the drawing rolling member 80, and having a gear box, such as including a suitable gear arrangement. The embodiment of the wheeled compass 10a is similar to the embodiment of the wheeled compass 10, as described above. The motor 140 can also include a housing 142, a power source 145, and an on/off switch 147, and can also include at least one opening 149 in the housing 142 to allow for air to enter the housing 142 such as to cool the motor 140, for example.

Also, a plurality of motors 140 can be used in embodiments of the wheeled compass 10a. In this regard, one motor 140 can be associated with the control rolling member 70 and another motor 140 can be associated with the drawing rolling member 80. By adding a suitable resistance component to one of the motors 140 associated with the control rolling member 70, a resistance of the electrical energy flow can be controlled as can thereby control a force that drives and a speed of the control rolling member 70. Thus, the control rolling member 70 can move at a different speed from the speed of the drawing rolling member 80 as can assist in providing a relatively steady circulation path for the wheeled compass 10a in drawing a wanted circle or portion thereof, such as an arc 130, for example.

The power source 145 can be any type of suitable power source, such as one or more rechargeable AA batteries, such as one or more 1.2 volt batteries, that can power the motor 140. The connection between the shaft 35 of or associated with the motor 140 and the control rolling member 70 can be configured to include at least one bearing, such as a sleeve bearing, that can reduce the friction between the shaft 35 and the control rolling member 70 so as to allow the control rolling member 70 to rotate freely on the shaft 35. The shaft 35 and the drive shaft 45 of or associated with the motor 140 can be adapted to include at least one and desirably a plurality of securing members 55 to substantially prevent the control rolling member 70 and the drawing rolling member 80 from respectively moving relative to the shaft 35 and the drive shaft 45 while the wheeled compass 10a is in motion to draw the wanted circle or the portion thereof, such as the wanted arc 130 on the surface S.

Continuing with reference to FIG. 4, by way of operation, the shaft 35 of or associated with the motor 140 is coupled to the control rolling member 70 while the drive shaft 45 of or associated with the motor 140 is coupled to the drawing rolling member 80; and the drawing arm 90 having a supporting assembly 95, such as including a bearing, such as a sleeve bearing, is coupled to an end 65 of the drive shaft 45 of the motor 140. As described, the drawing arm 90 includes the holder 97 being adapted to hold a drawing instrument 100 that draws the wanted circle or portion thereof upon movement of the drawing rolling member 80 on the surface S.

When the on/off switch 147 is turned to the "on" position, the motor 140 is activated and the gear arrangement in the gear box driven by the motor 140 can begin to rotate and, in turn, rotate the drive shaft 45 in communication with the drawing rolling member 80. The rotating drive shaft 45 can then rotate the drawing rolling member 80 in a suitable direction, such as in a forward direction in a circular path. The rotation of the drawing rolling member 80 powered by the motor 140 can result in the rotation of the control rolling member 70 on the shaft 35 of or associated with the motor 140. The motor 140 can continue to operate and rotate the drawing rolling member 80 until a circle, such as the circle 120 or a portion thereof, such the arc 130, having the desired radius of the wanted circle or the portion thereof is completed, as illustrated in FIG. 4, and the on/off switch 147 is then turned to the "off" position. The motor 140 can provide a relatively more stable, non-random movement of the wheeled compass 10a, for example.

Referring to FIG. 1-4, the control rolling member 70 can include a wheel, a sphere, a ball, a spoke-like structure, or any other suitable shaped structure capable of rotation. The control rolling member 70 can be formed from any suitable material, such as plastic, wood or metal, and can have a suitable selectively adjustable radius Z to draw the circle 120 or a portion thereof, such as the arc 130, as illustrated in FIGS. 3 and 4, corresponding to a wanted circle having a specific radius R. It is desirable that the angle formed by the connection between the control rolling member 70 and the shaft 20 be approximately 90°, as illustrated by FIG. 2, or can be another suitable angle as can depend on the use or application, and should not be construed in a limiting sense.

The drawing rolling member 80 can include a wheel, a sphere, a spoke-like structure, or any other suitable shaped structure capable of rotation. The drawing rolling member 80 can be formed from any suitable material, such as plastic, wood or metal, and can have any suitable radius Y to draw the circle 120 or a portion thereof, such as the arc 130, such as illustrated in FIGS. 3 and 4, corresponding to a wanted circle having a specific radius R. It is desirable that the angle formed by the connection between the drawing rolling member 80 and the shaft 20 be approximately 90°, as illustrated by FIG. 2, or can be another suitable angle as can depend on the use or application, and should not be construed in a limiting sense.

It is to be noted that, as described, the length X of the shaft 20, the radius Y of the drawing rolling member 80, and the selectively adjustable radius Z of the control rolling member 70 can be adjusted such as using relation (1) herein to draw a wanted circle or a portion thereof, such as a wanted arc, having a specific radius R, as illustrated in FIG. 2, for example. A desirable approach to drawing a wanted circle or a portion thereof, such as a wanted arc, having a specific radius R with embodiments of a wheeled compass, such as the wheeled compass 10 and the wheeled compass 10a, is to set the length X of the shaft 20 to a specific length and set the radius Y of the drawing rolling member 80 to a specific length and determine the selectively adjustable radius Z of the control rolling member 70 in accordance with the equation or relation (1) referenced herein to draw a wanted circle or a wanted arc having a specific radius R, for example.

Figure 5A:
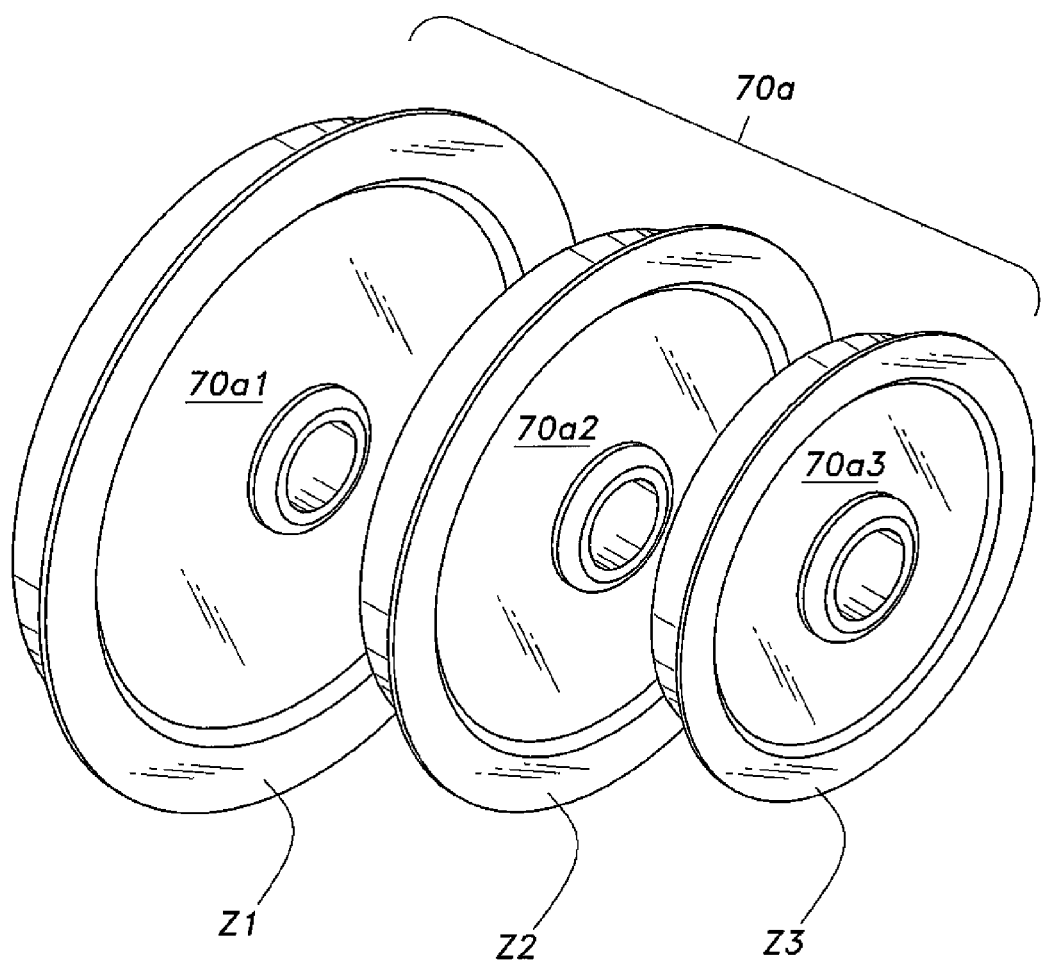
FIG. 5A is an embodiment of a control rolling member including a set of control rolling members, the set of control rolling members including a plurality of control rolling members, each having a different radius, according to the present invention.

Referring to FIGS. 1A-4 and 5A, with particular reference to FIG. 5A, an embodiment of a control rolling member 70a includes a set of control rolling members, the set of control rolling members including a plurality of control rolling members, such as control rolling members 70a1, 70a2 and 70a3, to be selectively coupled to the shaft, such as the shaft 20 or the shaft 35, for example. Each control rolling member 70a1, 70a2 and 70a3 has a different radius to provide a selectively adjustable radius for the control rolling member 70a so as to correspond to a radius R of a wanted circle or a portion thereof, such as a wanted arc, to be drawn, such as a radius Z1, a radius Z2, and a radius Z3, as illustrated in FIG. 5A, as can correspond to a plurality of wanted circles having corresponding different radii R.

By way of operation, when the selectively adjustable radius Z of the control rolling member corresponding to the radius R of the wanted circle or portion thereof, such as a wanted arc, is determined, such as by using relation (1) above, a control rolling member having the required radius Z, such as one of control rolling members 70a1, 70a2 and 70a3, is selected from the set of control rolling members 70a and is coupled to the shaft, such as the shaft 20 or the shaft 35, as illustrated in FIGS. 1A, 1B, and 4, of the wheeled compass, such as the wheeled compass 10 or the wheeled compass 10a, for example. The wheeled compass, such as the wheeled compass 10 or the wheeled compass 10a, can then be moved, either by the hand H or by the motor 140, in a suitable direction, such as in a forward direction and in a circular path, until the wanted circle or portion thereof, such as the wanted arc, having the required radius R is completed.

Figure 5B:
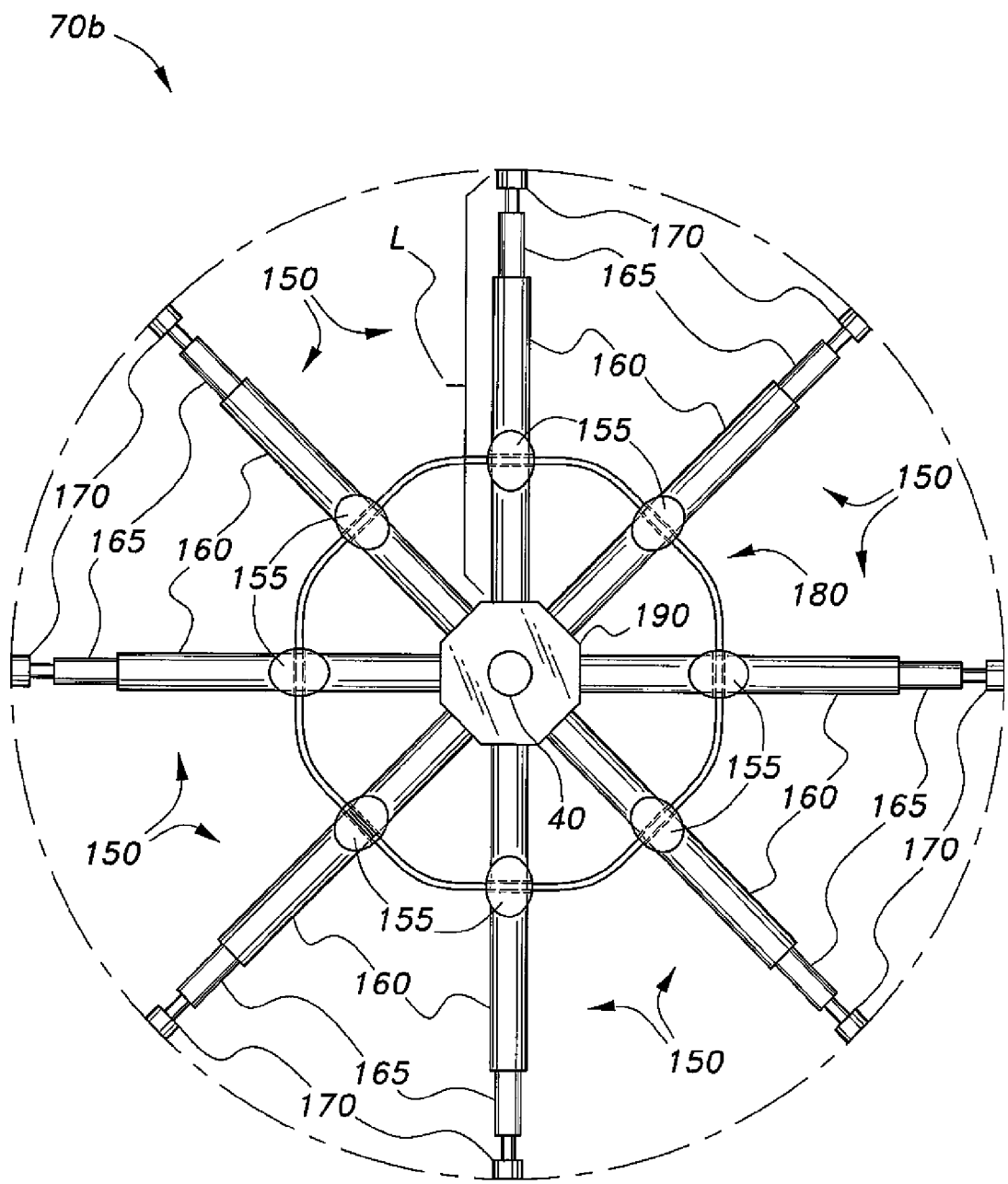
FIG. 5B is an embodiment of a control rolling member of a wheeled compass having a plurality of adjustable rods according to the present invention.

Referring to FIGS. 1A-4, and 5B, with particular reference to FIG. 5B, an embodiment of a control rolling member 70b includes a plurality of adjustable rods 150 each having a selectively adjustable length L, as illustrated in FIG. 5B, so as to selectively adjust the radius Z of the control rolling member 70b to a corresponding length to draw a wanted circle or portion thereof, such as a wanted arc, that has a specific radius R. The control rolling member 70b can have a hub 190 adapted to receive the plurality of adjustable rods 150 and position the adjustable rods 150 in a generally circular relation. The plurality of adjustable rods 150 can be formed from any suitable material, such as plastic, wood and metal, as can suitably support the control rolling member 70b.

Each of the adjustable rods 150 can include a locking mechanism 155 as can substantially prevent the adjustable rods 150 from increasing or decreasing in length from a set length L, such as to maintain or substantially maintain the length L to correspond to a radius R of the wanted circle or portion thereof, so as to maintain or substantially maintain the desired shape and diameter of the control rolling member 70b once it has been set. It is to be noted that the plurality of adjustable rods 150 can include a plurality of telescoping rods, such as illustrated in FIG. 5B, configured to include an outer tube 160 having a given diameter and at least one inner tube 165 having a diameter less than the given diameter of the outer tube 160.

The plurality of adjustable rods, such as the described telescoping rods, are each adapted to selectively extend and retract to achieve a given length L to conform with a selectively adjustable radius Z for the control rolling member 70b. Each of the plurality of adjustable rods 150 can also include a supporting member 170 at an end thereof to support the control rolling member 70b. The generally circular shape of the control rolling member 70b can be further maintained through the use of a connecting member 180, such as a rubber thread or a wire, such as can extend along each of the locking mechanisms 155, for example.

By way of operation, after the selectively adjustable radius Z for the control rolling member 70b has been determined that corresponds to the radius R of the wanted circle or portion thereof, such as the wanted arc, such as by using the formula or relation (1) referenced herein, the length L of the adjustable rods 150 can be adjusted so as to achieve the desired selectively adjustable radius Z for the control rolling member 70b needed to create the wanted circle or portion thereof, such as the wanted arc, with the desired radius R. Once the plurality of adjustable rods 150 have been set to the desired corresponding length L, the locking mechanism 155 can be tightened so as to substantially prevent the length L of the adjustable rods 150 from substantially increasing and/or decreasing from the set length L.

When the locking mechanism 155 has been tightened, the locking mechanism 155 can also assist in maintaining the generally circular shape of the control rolling member 70b. At the time of tightening the locking mechanism 155, each of the adjustable rods 150 are either previously integrated with or can be inserted into the hub 190, for example. The connecting member 180 can further be used to substantially ensure that the generally circular shape of the control rolling member 70b is substantially maintained. The hub 190 of the control rolling member 70b can then be coupled to the shaft, such as to the first end 40 of the shaft 20 or to a corresponding end of the shaft 35. Once the control rolling member 70b and the drawing rolling member 80 are respectively arranged on the shaft, such as the shaft 20, the shaft 35 or the drive shaft 45, of the wheeled compass, such as the wheeled compass 10 or the wheeled compass 10a, the wheeled compass, such as the wheeled compass 10 or the wheeled compass 10a, can be placed on a surface, such as the surface S, and moved either by the hand H or by the motor 140 until the wanted circle or portion thereof, such as the wanted arc, having the desired radius R is completed.

Figure 5C:
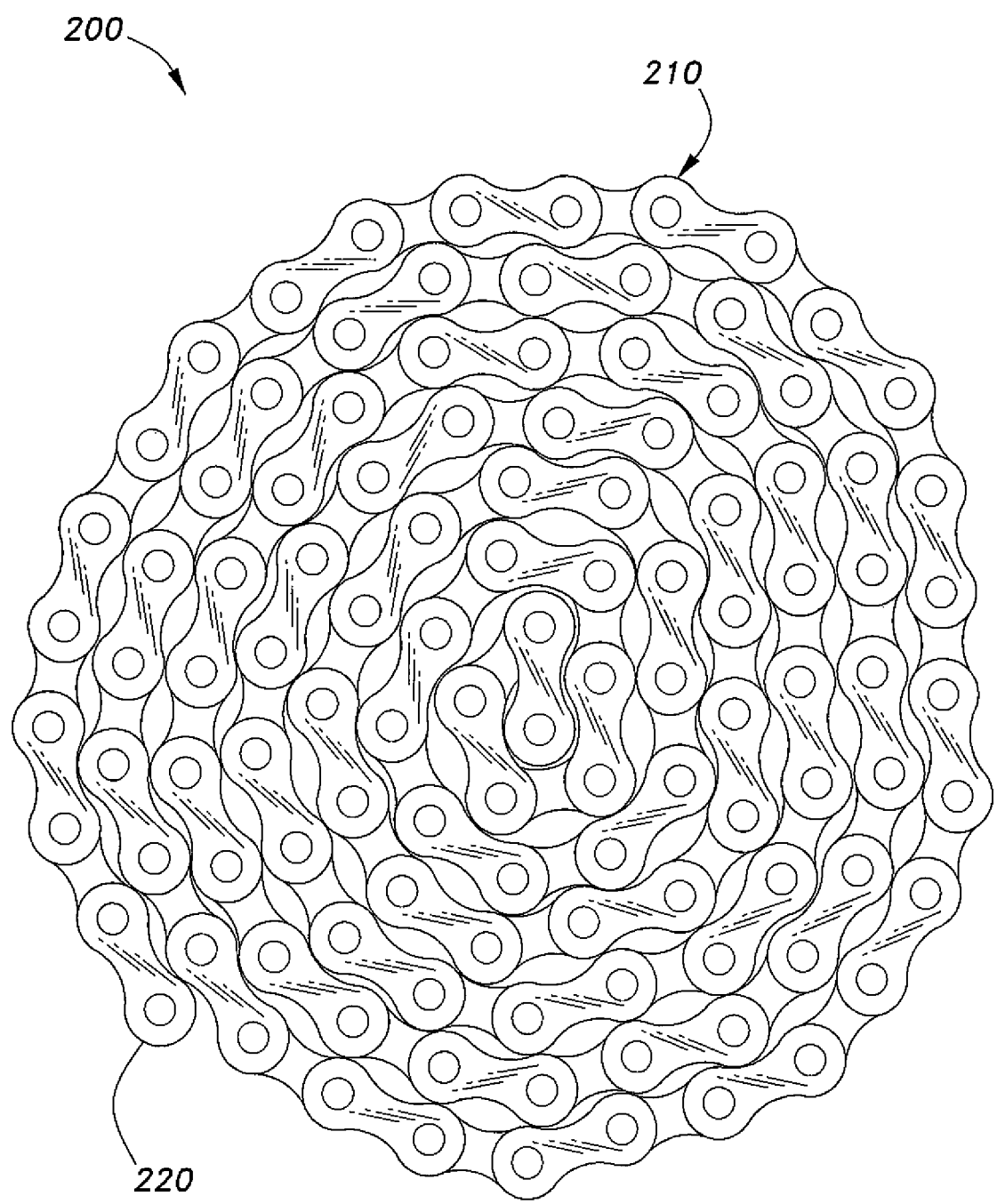
FIG. 5C is a top view of a flexible member, such as a chain, that can be used in conjunction with an embodiment of a control rolling member of a wheeled compass to selectively adjust the radius of the control rolling member of the wheeled compass according to the present invention.
Figure 5D:
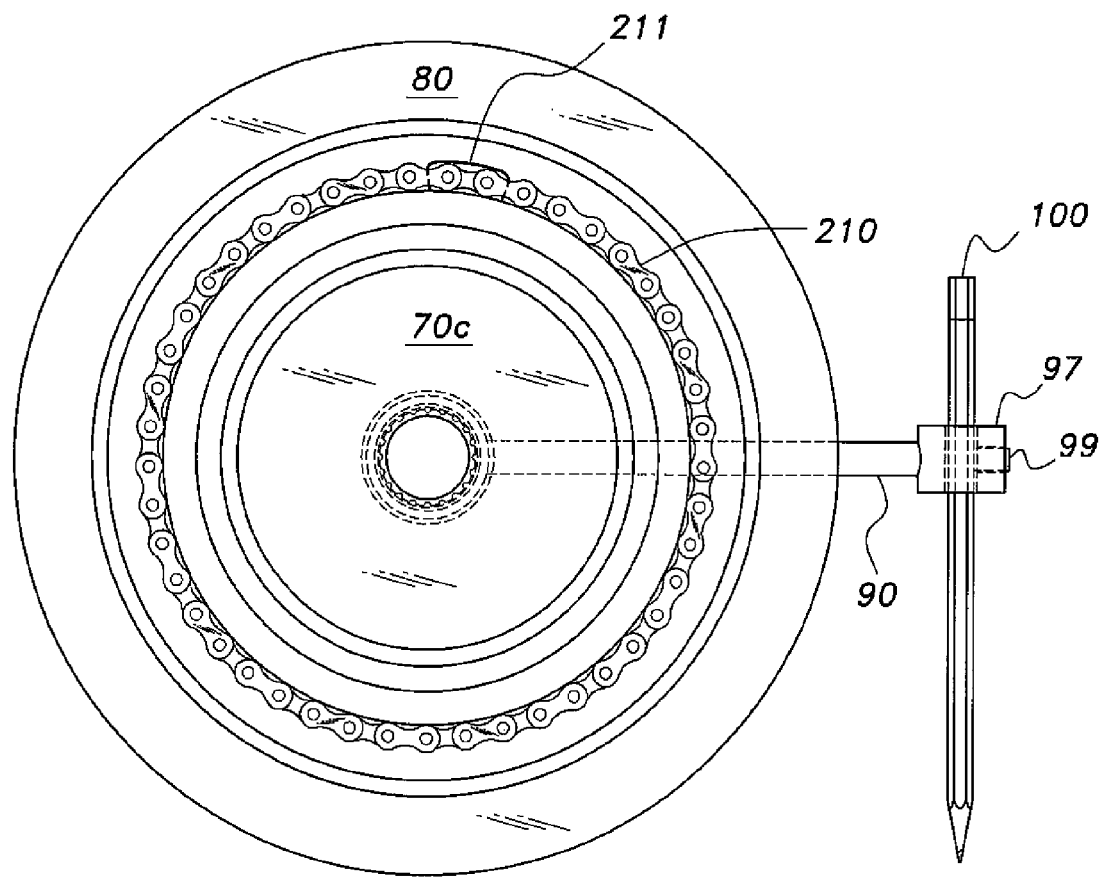
FIG. 5D is an embodiment of a control rolling member of a wheeled compass having a flexible member, such as a chain, according to the present invention.
Figure 5E:
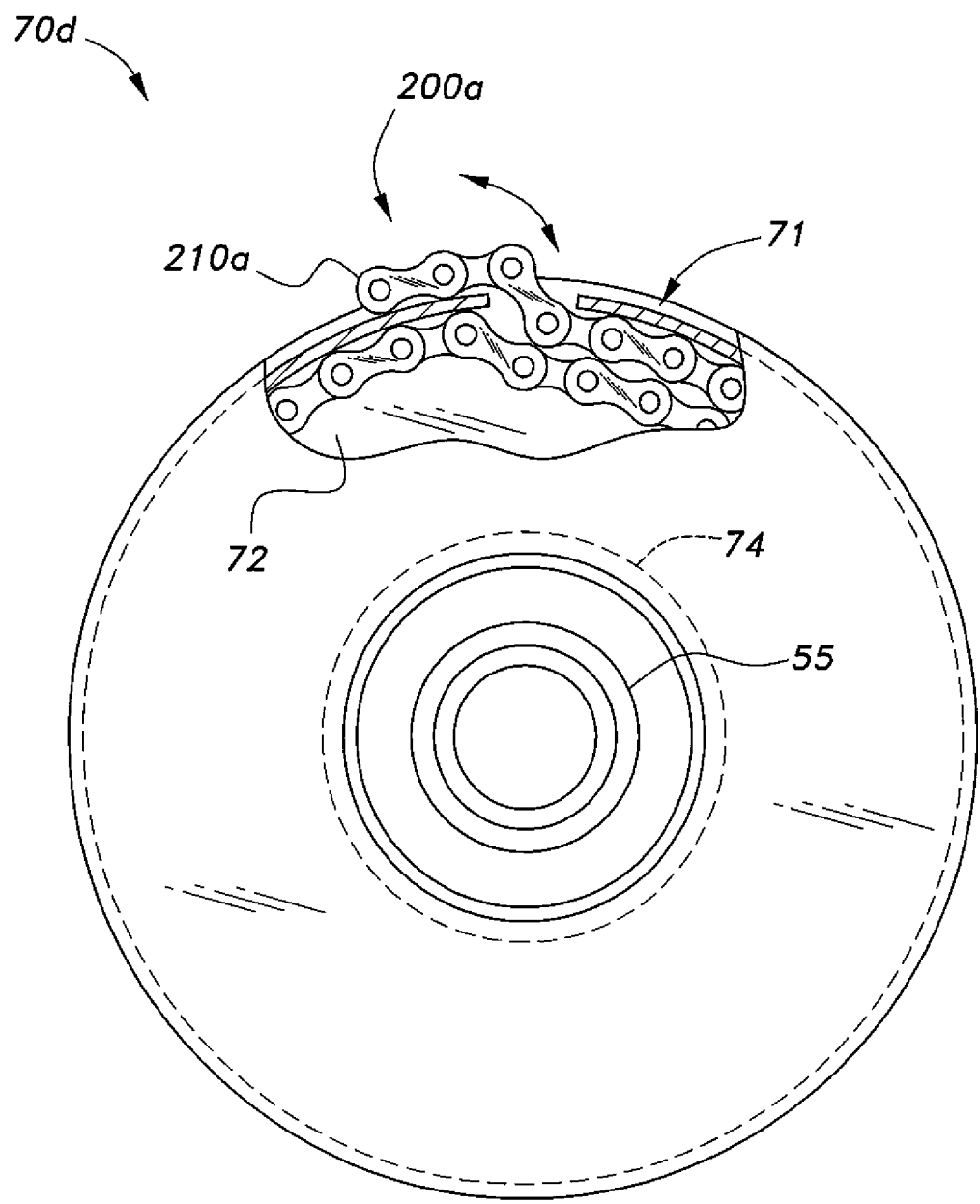
FIG. 5E is a side view of an embodiment of a control rolling member of a wheeled compass including a housing containing a coiled flexible member, such as a coiled chain, inside the control rolling member to selectively adjust the radius of the control rolling member of the wheeled compass according to the present invention.
Figure 5F:
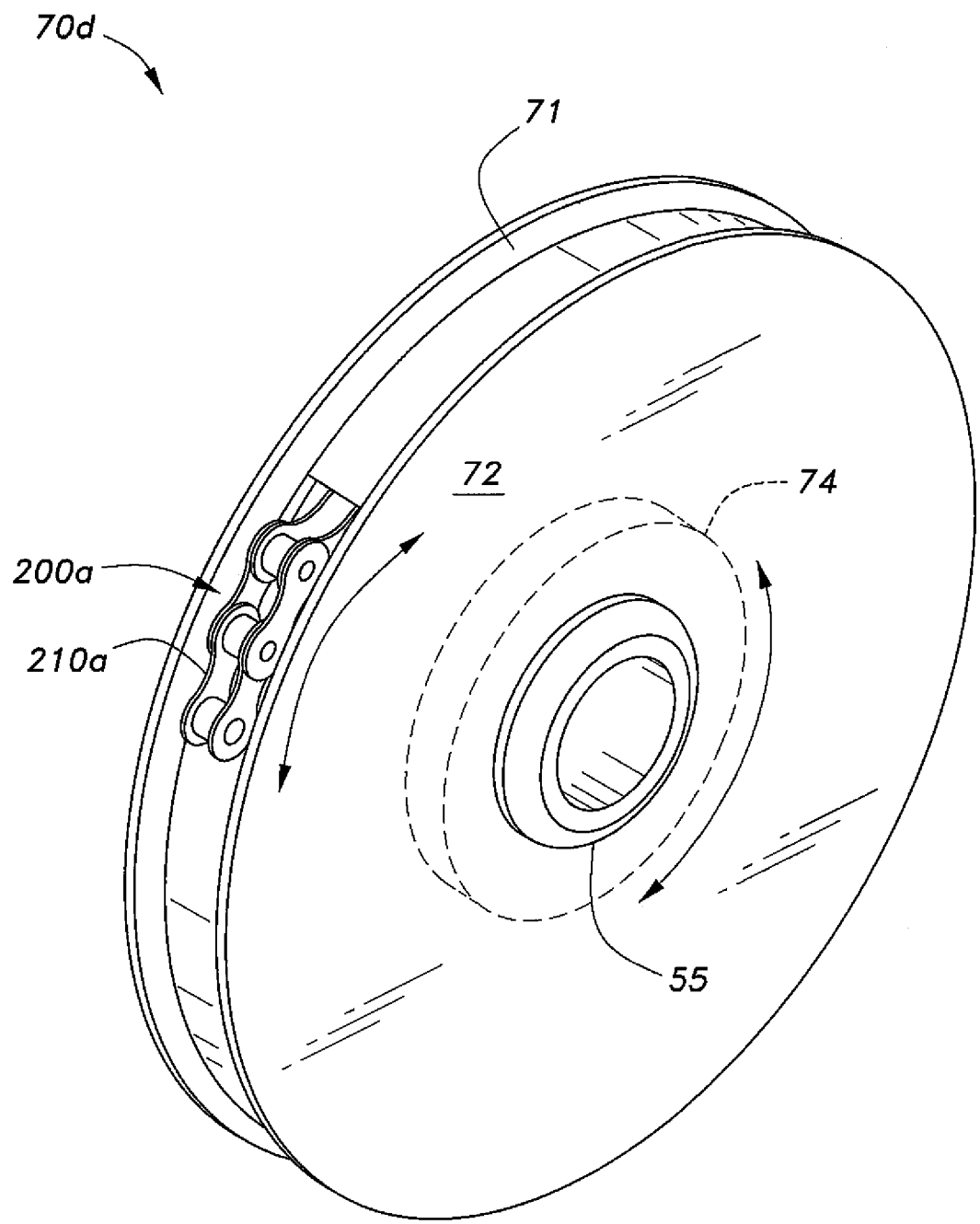
FIG. 5F is a perspective view of an embodiment of a control rolling member of a wheeled compass of FIG. 5E including a coiled flexible member, such as a coiled chain, inside the control rolling member to selectively adjust the radius of the control rolling member of the wheeled compass according to the present invention.
Figure 5G:
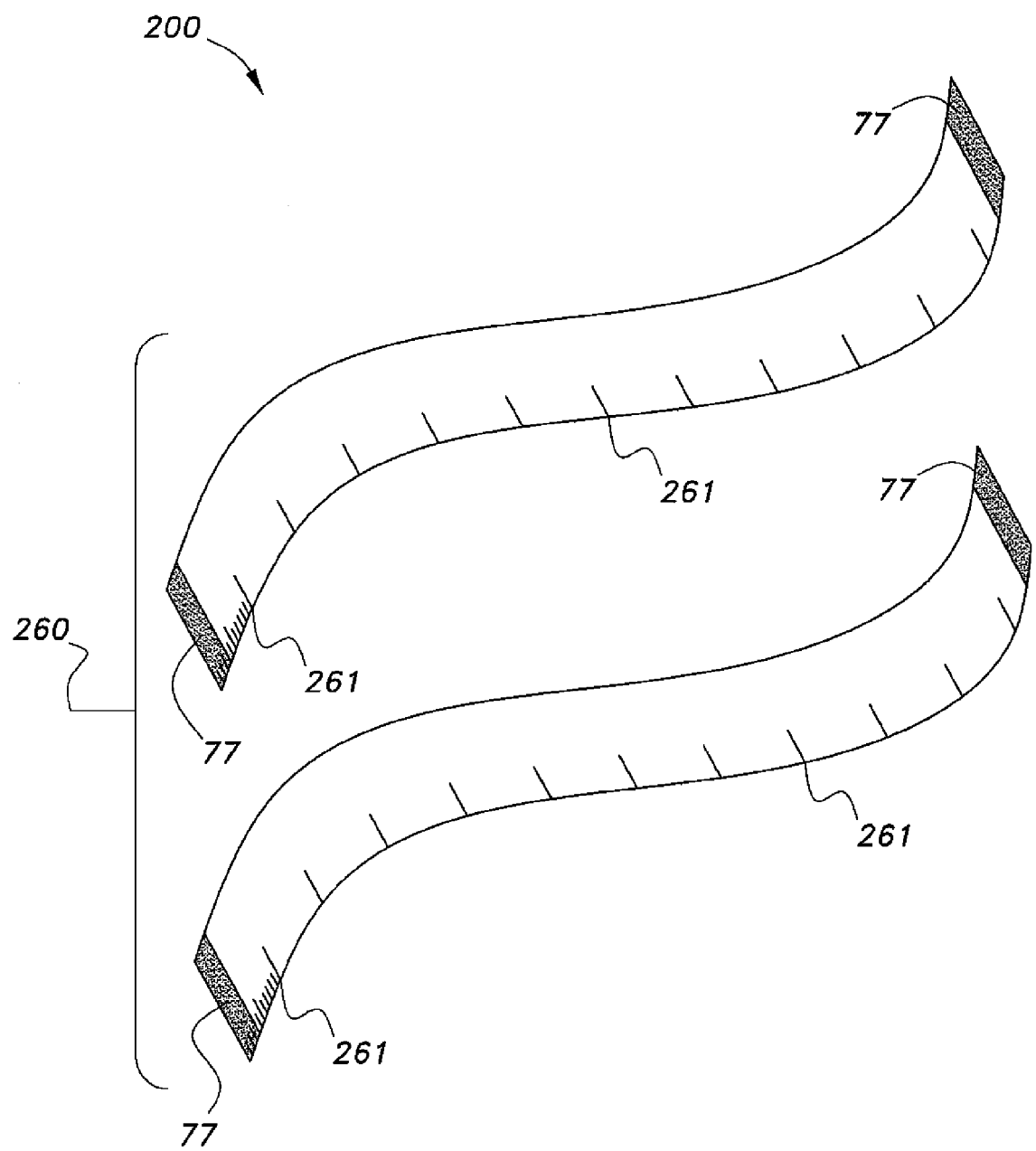
FIG. 5G is a perspective view of a flexible member, such as a measuring tape, having a plurality of segments as can form a control rolling member or as can be used in conjunction with an embodiment of a control rolling member of a wheeled compass to selectively adjust the radius of the control rolling member of the wheeled compass according to the present invention.

Referring to FIGS. 5C-5H, embodiments of a control rolling member, such as a control rolling member 70c, can be adapted to include a flexible member 200 or the control rolling member can be formed of the flexible member 200, such as a chain 210, as illustrated in FIG. 5C, and such as a measuring tape 260, as illustrated in FIG. 5G. It is to be noted that the flexible member 200 can be coupled to the shaft, such as the shaft 20 or the shaft 35, of the wheeled compass, such as the wheeled compass 10 or the wheeled compass 10a, to hold the flexible member 200 in place while the wheeled compass, such as the wheeled compass 10 or the wheeled compass 10a, is in motion to draw a wanted circle or a portion thereof, such as a wanted arc. The chain 210 can be formed from any suitable material, such as metal, wood or plastic, for example. Further, it is to be noted that the measuring tape 260 can be formed from any suitable material, such as plastic, metal or cloth, for example.

The chain 210 can be configured to include a plurality of links 220 (FIG. 5C). The length of the chain 210 can be adjusted, such as by adding or removing links 220 to the chain 210, to selectively adjust the radius Z of the control rolling member, such as control rolling member 70c, to correspond to the radius R of the wanted circle or portion thereof, such as the wanted arc, as illustrated in FIG. 5D. It is to be noted that the chain 210 can be configured to include a fastener 211, such as a latch, as illustrated in FIG. 5D, to secure one end of the chain 210 to the other end of the chain 210 after it is wrapped around the control rolling member 70c, for example.

Figure 5H:
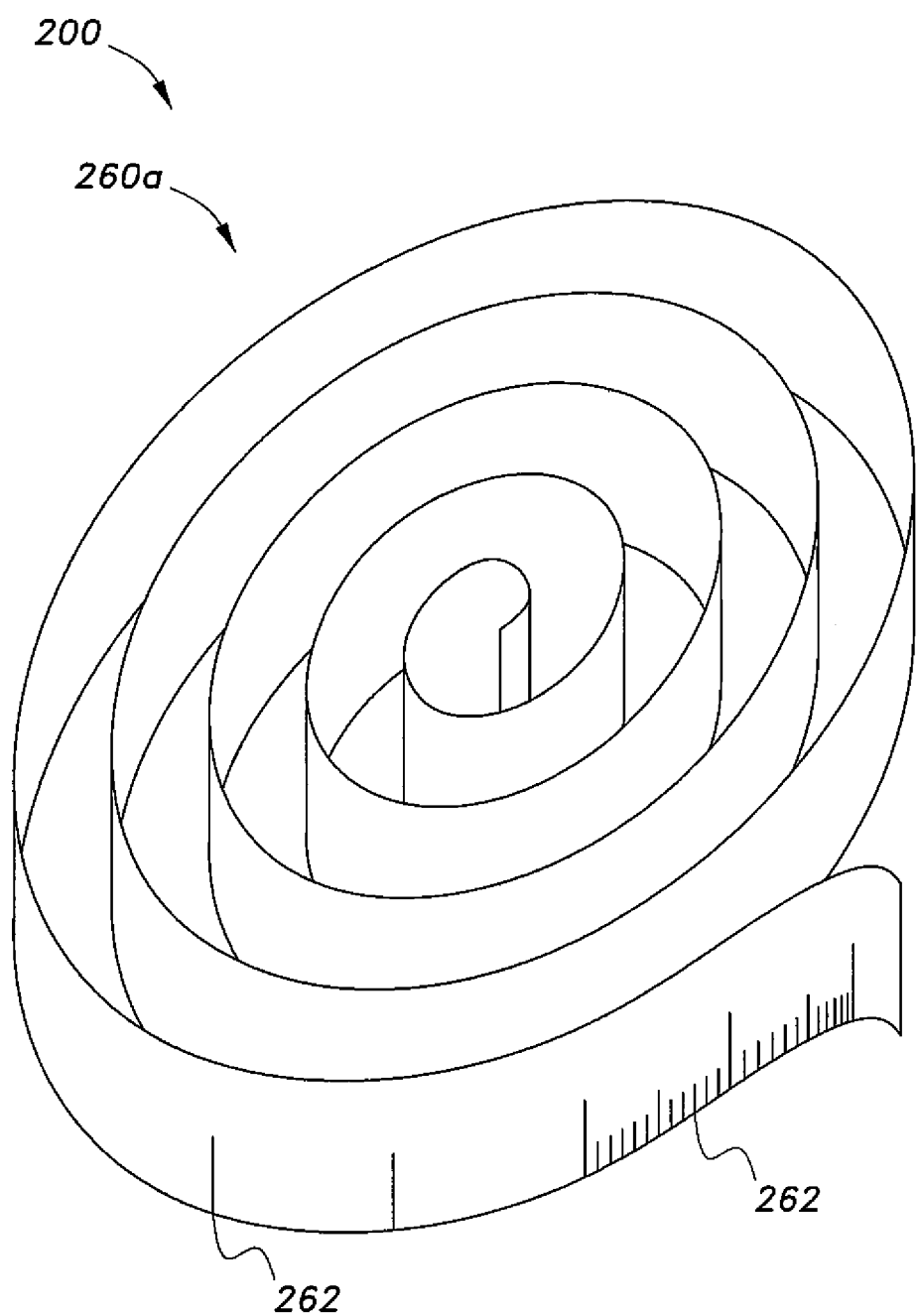
FIG. 5H is a perspective view of a coiled flexible member, such as a coiled measuring tape, as can form a control rolling member or that can be used in conjunction with an embodiment of a control rolling member of a wheeled compass to selectively adjust the radius of the control rolling member of the wheeled compass according to the present invention.

Also, it is contemplated that the measuring tape 260 forming the flexible member 200 can be formed from multiple segments of measuring tape 260, each having a discrete length and at least one and desirably a plurality of connecting members 77, such as can be Velcro® or a similar type material, as illustrated in FIG. 5G, or the flexible member 200 can be formed from one relatively long continuous strip of measuring tape 260a, as illustrated in FIG. 5H. It is to be noted that the individual segments of measuring tape 260, as illustrated in FIG. 5G, can be coupled to one another through the corresponding connecting members 77 to form a measuring tape having a specific length, for example.

The flexible member 200, such as the measuring tape 260 or the measuring tape 260a, can include distinctive indicia 261 and 262, such as markings or etchings, to indicate corresponding lengths of or along the measuring tape, such as measuring tape 260 or measuring tape 260a, for example. The flexible member 200, such as the chain 210 and the measuring tape, such as the measuring tape 260 or the measuring tape 260a, can be adapted to be wrapped around the control rolling member 70c, as illustrated in FIG. 5D, so as to selectively adjust the radius Z of the control rolling member 70c to draw a wanted circle or portion thereof, such as a wanted arc, with a desired radius R.

Referring to FIGS. 5E and 5F, an embodiment of a control rolling member 70d can be configured to have a housing 72 containing a coiled flexible member 200a, such as a coiled chain 210a, as illustrated in FIGS. 5E and 5F. Also, the measuring tape 260a can likewise be coiled and can be arranged in a similar manner to the coiled chain 210a in the housing 72 in FIGS. 5E and 5F, that can be selectively withdrawn from and retracted into the housing 72 so as to selectively adjust the radius Z of the control rolling member 70d to draw a wanted circle or a portion thereof, such as a wanted arc, with a desired radius R.

When selectively withdrawn, the coiled flexible member 200a, such as the coiled chain 210a or the coiled measuring tape 260a, can be wrapped along a track 71 around the control rolling member 70d to selectively adjust the radius Z of the control rolling member 70d. The amount or length of coiled flexible member 200a, such as the coiled chain 210a or the coiled measuring tape 260a, that can be selectively withdrawn from the control rolling member 70d and wrapped along the track 71 around the control rolling member 70d typically will depend on the length of the selectively adjustable radius Z of the control rolling member 70d that corresponds with the radius R of the wanted circle or portion thereof, such as the wanted arc.

The control rolling member 70d can also be configured to have a spooling device 74 on which the coiled flexible member 200a, such as the coiled chain 210a or the coiled measuring tape 260a, can be wound. It is to be noted that the coiled flexible member 200a, such as the coiled chain 210a or the coiled measuring tape 260a, can be wound around the spooling device 74 manually or mechanically, for example. Further, the coiled flexible member 200a can be configured to include a fastener, similar to the fastener 211 illustrated in FIG. 5D or similar to the connecting members 77 illustrated in FIG. 5G, to secure the coiled flexible member 200a once the correct amount or length of the coiled flexible member 200a has been selectively withdrawn from the control rolling member 70d.

Figure 5I:
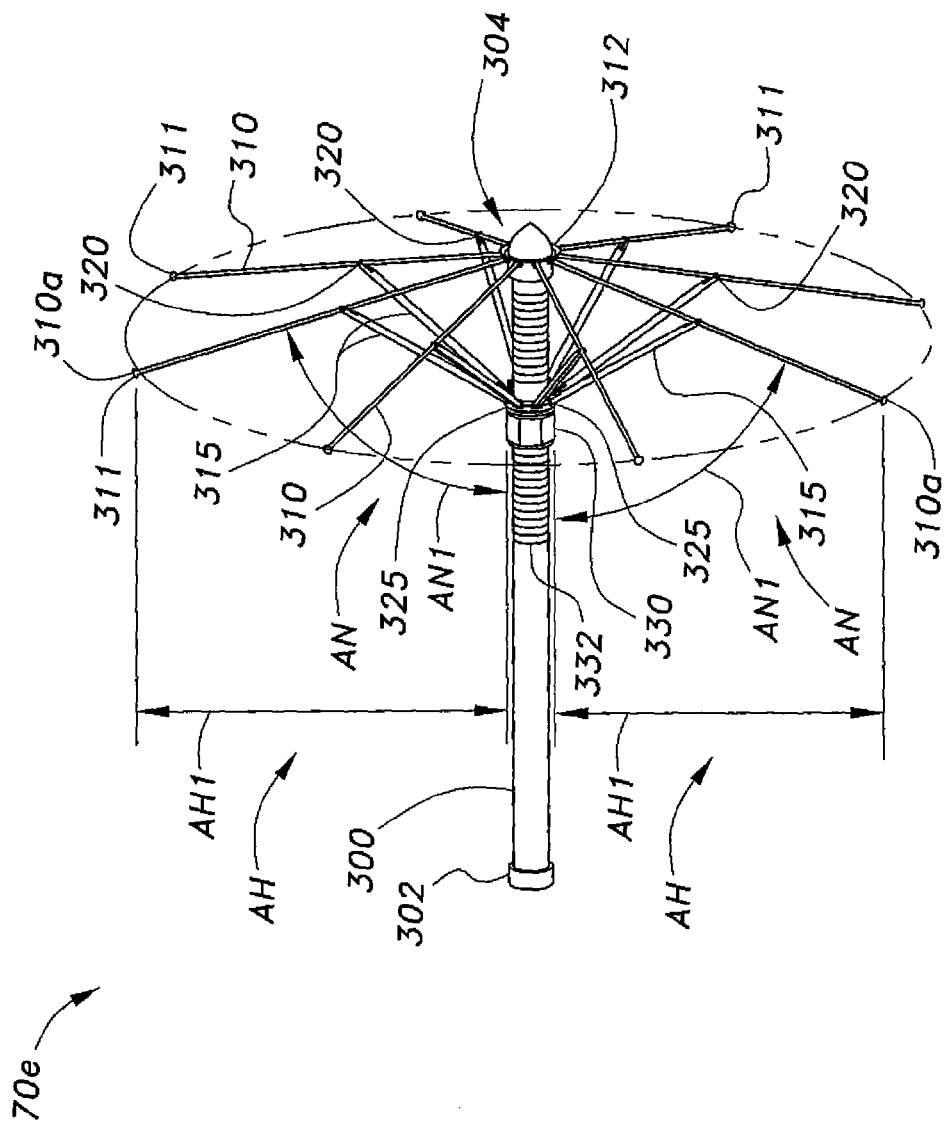
FIG. 5I is an embodiment of a control rolling member of a wheeled compass having a plurality of adjustable arms having a first angular height relative to a supporting shaft according to the present invention.
Figure 5J:
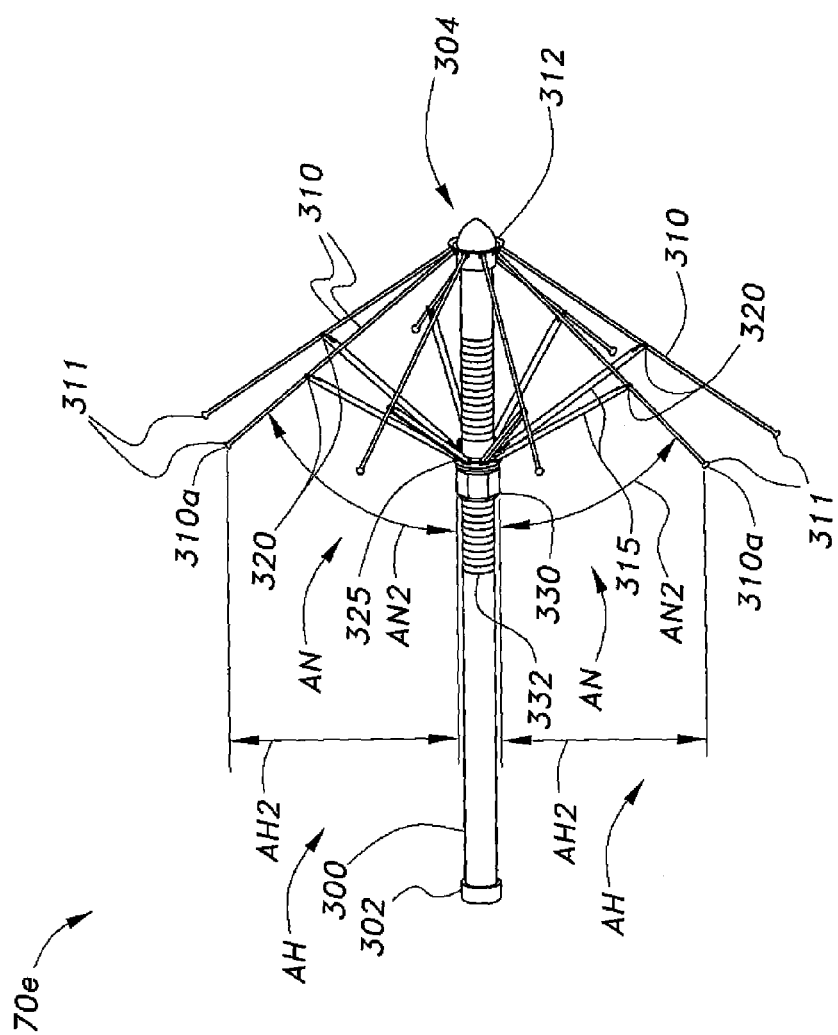
FIG. 5J is an embodiment of a control rolling member of a wheeled compass of FIG. 5I having a plurality of adjustable arms having a second angular height relative to a supporting shaft according to the present invention.

Referring to FIGS. 5I and 5J, an embodiment of the control rolling member 70e can be configured to include a supporting shaft 300 having a proximal end 302 and a distal end 304. A plurality of adjustable arms 310 are moveably coupled to the distal end 304 of the supporting shaft 300 through a first common coupling member 312, and a plurality of adjustable arm support members 315 are adapted to support each of the plurality of adjustable arms 310. It is to be noted that each of the plurality of adjustable arms 310 is moveably coupled at a first pivoting arrangement 320 to a corresponding adjustable arm support member 315. The plurality of adjustable arm support members 315 are in turn coupled to a second common coupling member 330 by a pivoting arrangement 325. The second common coupling member 330 is adapted to move along the supporting shaft 300 to adjust an angular height AH of the adjustable arm 310 relative to the supporting shaft 300 formed by a corresponding angle AN. The angular height AH is measured in a substantially perpendicular direction from an outer end of a corresponding adjustable arm 310, such as an outer end 310a, to the supporting shaft 300, with a corresponding angle AN being formed by the corresponding adjustable atm 310 and the supporting shaft 300.

Also, the supporting shaft 300 in conjunction with the second common coupling member 330 can be configured to include a locking arrangement 332 to substantially prevent the corresponding adjustable arm 310 from substantially increasing or decreasing in angular height AH relative to the supporting shaft 300 from a set position corresponding to the radius R of a wanted circle or portion thereof, such as a wanted arc. Each of the plurality of adjustable arms 310 can also include a supporting member 311 at an end thereof to support the control rolling member 70e. The supporting shaft 300 can be integrally formed with or coupled to the shaft, such as the shaft 20 or the shaft 35 of the wheeled compass, such as the wheeled compass 10 or the wheeled compass 10a, so as to be co-axially arranged relation with the shaft, such as the shaft 20 or the shaft 35 of the wheeled compass, such as the wheeled compass 10 or the wheeled compass 10a, for example.

It is to be noted that in the control rolling member 70e there can be a plurality of angular heights AH corresponding to a plurality of angles AN, such as angular height AH1 corresponding to an angle AN1 (FIG. 5I) and angular height AH2 corresponding to an angle AN2 (FIG. 5J), the angular height AH2 being less than the angular height AH1, for example. The angular heights AH can be selectively adjusted so that the control rolling member 70e can have a suitable selectively adjustable radius Z to draw a wanted circle or portion thereof, such as a wanted arc, such as the circle 120 or the arc 130, as illustrated in FIGS. 3 and 4, corresponding to a wanted circle or a portion thereof having a specific radius R. The embodiments of the control rolling member 70e respectively including the plurality of adjustable arms 310 can operate in a similar manner to the embodiment of the control rolling member 70b described above, for example.

As described, the selectively adjustable radius Z of the control rolling member, such as the control rolling members 70, 70a, 70b, 70c, 70d and 70e, can be selectively adjusted so that the radius Z of the control rolling member, such as the radius Z of the control rolling members 70, 70a, 70b, 70c, 70d and 70e, corresponds with the radius R of the wanted circle or portion thereof, such as the wanted arc. Once the selectively adjustable radius Z of the control rolling member, such as of the control rolling members 70, 70a, 70b, 70c, 70d and 70e, is set to the desired radius Z, the control rolling member, such as the control rolling members 70, 70a, 70b, 70c, 70d and 70e, can be coupled to the shaft, such as to the first end 40 of the shaft 20 or to corresponding end of the shaft 35. Also, as to the control rolling member 70e, the supporting shaft 300 thereof can be integrally formed with or can be coupled to the first end 40 of the shaft 20 or to a corresponding end of the shaft 35, for example.

Also, as described, the drawing rolling member 80 can be coupled to the shaft 20, such as of the wheeled compass 10, as illustrated in FIGS. 1A and 1B, or to the drive shaft 45, as illustrated in FIG. 4, depending on whether the motor 140 is being used to move the wheeled compass, such as the wheeled compass 10a. The at least one and desirably a plurality of securing members 55 can be used to secure the control rolling member, such as of the control rolling members 70, 70a, 70b, 70c and 70d, and can also secure the drawing rolling member 80 from substantially unnecessary movement while the wheeled compass, such as the wheeled compass 10 or the wheeled compass 10a, is in motion to draw a wanted circle or portion thereof, such as a wanted arc, of a radius R.

Further, as described, when the control rolling member, such as the control rolling members 70, 70a, 70b, 70c, 70d and 70e, and the drawing rolling member 80 have been coupled to the wheeled compass, such as the wheeled compass 10 and the wheeled compass 10a, the drawing arm 90 can be coupled to that shaft 20, as illustrated in FIGS. 1A and 1B or can be coupled to the drive shaft 45, as illustrated in FIG. 4. The drawing arm 90 is adapted to hold the drawing instrument 100 at a suitable, predetermined angle formed by the drawing arm 90 and the drawing instrument 100 relative to the position of the drawing arm 90 relative to the shaft, such as the shaft 20 or the drive shaft 45. It is desirable that the drawing arm 90 be coupled to the supporting assembly 95, such as including a bearing, such as sleeve bearing, to substantially prevent the drawing arm 90 from rotating relative to the shaft, such as the shaft 20 or the drive shaft 45, when the wheeled compass, such as the wheeled compass 10 and the wheeled compass 10a, is in motion to draw a wanted circle or portion thereof, such as a wanted arc of a radius R.

The drawing instrument 100, such as a pencil or stylus, can then be inserted into the holder 97 of the drawing arm 90 and secured using the fastener 99, such as a set screw. Once the drawing instrument 100 is inserted into the holder 97, the wheeled compass, such as the wheeled compass 10 and the wheeled compass 10a, can be placed on the surface S on which to draw the wanted circle or portion thereof, such as the wanted arc, and moved in a suitable direction, such as a forward circular direction, either by the hand H (FIG. 3) or through the use of the motor 140 (FIG. 4) so as to draw the wanted circle or portion thereof, such as the wanted arc, having the specific radius R.

It is to be understood that the present invention is not limited to the embodiments described above, but encompasses any and all embodiments within the scope of the following claims.

I claim:

1. A wheeled compass, comprising:
  a shaft including a first portion having a first end and a second portion having a second end, the shaft having a given length;
  a control rolling member adapted to be coupled to the first end of the shaft, the control rolling member adapted to have a selectively adjustable radius;
  a drawing rolling member adapted to be coupled to the second portion of the shaft, the drawing rolling member having a given radius greater than the selectively adjustable radius of the control rolling member;
  at least one motor, the at least one motor being respectively coupled to the control rolling member and to the drawing rolling member, the at least one motor being adapted to move the wheeled compass to draw the circle or the portion thereof; and
  a drawing arm coupled to the shaft, the drawing arm being adapted to hold a drawing instrument adapted to draw on a surface,
  wherein the control rolling member and the drawing rolling member are co-axially arranged on the shaft, and
  wherein the selectively adjustable radius is of a length corresponding to a radius of a circle or a portion thereof to be drawn by the drawing instrument of the wheeled compass, the length of selectively adjustable radius being determined based on the radius of the circle or the portion thereof to be drawn, the given radius of the drawing rolling member and on the given length of the shaft.

2. The wheeled compass according to claim 1, wherein the shaft further comprises a gripping member adapted to move the wheeled compass by a hand.

3. The wheeled compass according to claim 1, wherein the control rolling member comprises a set of control rolling members including plurality of control rolling members, each having a different radius to provide the selectively adjustable radius corresponding to the radius of the circle or the portion thereof to be drawn.

4. The wheeled compass according to claim 1, wherein the control rolling member comprises a plurality of adjustable rods, each of the plurality of adjustable rods being selectively adjustable to a length corresponding to the radius of the circle or the portion thereof to be drawn.

5. The wheeled compass according to claim 4, wherein the plurality of adjustable rods comprise a plurality of telescoping rods.

6. The wheeled compass according to claim 1, wherein the control rolling member comprises a supporting shaft and a plurality of adjustable arms, each of the plurality of adjustable arms being selectively adjustable to provide an angular height of the adjustable arm relative to the supporting shaft, the angular height corresponding to the radius of the circle or the portion thereof to be drawn, the supporting shaft of the control rolling member being in a co-axially arranged relation with the shaft of the wheeled compass.

7. The wheeled compass according to claim 1, wherein the control rolling member comprises a flexible member to selectively adjust the selectively adjustable radius of the control rolling member to correspond to the radius of the circle or the portion thereof to be drawn.

8. The wheeled compass according to claim 7, wherein the flexible member comprises a chain.

9. The wheeled compass according to claim 7, wherein the flexible member comprises a measuring tape.

10. The wheeled compass according to claim 1, wherein the control rolling member comprises a housing having a coiled flexible member arranged therein, the coiled flexible member adapted to be selectively extended and retracted from the housing and arranged on the control rolling member to selectively adjust the selectively adjustable radius of the control rolling member to correspond to the radius of the circle or the portion thereof to be drawn.

11. A wheeled compass, comprising:
a shaft including a first portion having a first end and a second portion having a second end, the shaft having a given length;
a control rolling member adapted to be coupled to the first end of the shaft, the control rolling member including a plurality of adjustable rods each having a selectively adjustable length to selectively adjust a radius of the control rolling member;
a drawing rolling member adapted to be coupled to the second portion of the shaft, the drawing rolling member having a given radius greater than an adjusted radius of the control rolling member; and
a drawing arm coupled to the shaft, the drawing arm being adapted to hold a drawing instrument adapted to draw on a surface,
wherein the control rolling member and the drawing rolling member are co-axially arranged on the shaft, and
wherein the selectively adjustable length of each of the plurality of adjustable rods corresponds to a length of a radius of a circle or portion thereof to be drawn by the drawing instrument of the wheeled compass, the selectively adjustable length of each of the plurality of adjustable rods being determined based on the radius of the circle or the portion thereof to be drawn, the given radius of the drawing rolling member and on the given length of the shaft.

12. The wheeled compass according to claim 11, further comprising:
at least one motor, the at least one motor being respectively coupled to the control rolling member and to the drawing rolling member, the at least one motor being adapted to move the wheeled compass to draw the circle or the portion thereof.

13. The wheeled compass according to claim 11, wherein the plurality of adjustable rods comprises a plurality of telescoping rods.

14. The wheeled compass according to claim 13, wherein each of the plurality of adjustable rods further comprises:
a locking mechanism to substantially maintain the selectively adjustable length of each of the plurality of adjustable rods to correspond to the length of the radius of the circle or the portion thereof to be drawn.

15. A wheeled compass, comprising:
a shaft including a first portion having a first end and a second portion having a second end, the shaft having a given length;
a control rolling member adapted to be coupled to the first end of the shaft, the control rolling member including a flexible member adapted to be positioned on the control rolling member to selectively adjust a length of a radius of the control rolling member;
a drawing rolling member adapted to be coupled to the second portion of the shaft, the drawing rolling member having a given radius of a length greater than the length of an adjusted radius of the control rolling member; and
a drawing arm coupled to the shaft, the drawing arm being adapted to hold a drawing instrument adapted to draw on a surface,
wherein the control rolling member and the drawing rolling member are co-axially arranged on the shaft, and
wherein the flexible member is adapted to be positioned on the control rolling member to selectively adjust the length of the radius of the control rolling member to correspond to a radius of a circle or a portion thereof to be drawn by the drawing instrument of the wheeled compass, the length of the adjusted radius of the control rolling member being determined based on the radius of the circle or the portion thereof to be drawn, the length of the given radius of the drawing rolling member and on the given length of the shaft.

16. The wheeled compass according to claim 15, further comprising:
at least one motor, the at least one motor being respectively coupled to the control rolling member and to the drawing rolling member, the at least one motor being adapted to move the wheeled compass to draw the circle or the portion thereof.

17. The wheeled compass according to claim 15, wherein the flexible member comprises a chain.

18. The wheeled compass according to claim 15, wherein the flexible member comprises a measuring tape.

19. The wheeled compass according to claim 15, wherein the control rolling member comprises:
a housing having a coiled flexible member arranged therein, the coiled flexible member adapted to be selectively extended and retracted from the housing to position on the control rolling member to selectively adjust the length of the radius of the control rolling member to correspond to the radius of the circle or the portion thereof to be drawn.

* * * * *